United States Patent
Wang et al.

(10) Patent No.: US 8,149,763 B2
(45) Date of Patent: Apr. 3, 2012

(54) CONTROLLING A POWER LEVEL IN A WIRELESS COMMUNICATIONS SYSTEM WITH DIFFERENT SCRAMBLING CODES

(75) Inventors: Xiaohui Wang, Lund (SE); Elias Jonsson, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 419 days.

(21) Appl. No.: 12/296,444

(22) PCT Filed: Apr. 3, 2007

(86) PCT No.: PCT/EP2007/002876
§ 371 (c)(1),
(2), (4) Date: Sep. 30, 2009

(87) PCT Pub. No.: WO2007/115704
PCT Pub. Date: Oct. 18, 2007

(65) Prior Publication Data
US 2010/0039972 A1 Feb. 18, 2010

Related U.S. Application Data
(60) Provisional application No. 60/744,673, filed on Apr. 12, 2006.

(30) Foreign Application Priority Data

Apr. 12, 2006 (EP) ..................... 06388027

(51) Int. Cl.
H04B 7/005 (2006.01)
H04W 52/00 (2009.01)
(52) U.S. Cl. ...................... 370/318; 370/311

(58) Field of Classification Search ............... 370/310, 370/311, 315, 316, 317, 318, 342; 455/39, 455/500, 507, 517, 522
See application file for complete search history.

(56) References Cited

U.S. PATENT DOCUMENTS
6,490,461 B1 12/2002 Mueller
(Continued)

FOREIGN PATENT DOCUMENTS
EP 1 124 340 A1 8/2001
(Continued)

OTHER PUBLICATIONS
PCT International Search Report, dated Aug. 16, 2007, in connection with International Application No. PCT/EP2007/002876.

*Primary Examiner* — Chi Pham
*Assistant Examiner* — Robert Lopata
(74) *Attorney, Agent, or Firm* — Potomac Patent Group PLLC

(57) ABSTRACT

A power level of signals transmitted in a wireless communications system under a first or a second scrambling code, is controlled in an inner power control loop, where a quality measure is repetitively estimated and control commands generated from the quality measure and a quality measure reference value, which in an outer power control loop is adjusted in dependence on a performance level calculated for signals received during a time interval. A first value is adjusted in dependence on a performance level for time intervals with all signals transmitted under the first scrambling code and used during such time intervals. A second value is adjusted in dependence on a performance level for time intervals with at least some signals transmitted under the second scrambling code and used during at least a part of such time intervals.

22 Claims, 9 Drawing Sheets

U.S. PATENT DOCUMENTS

| | | | |
|---|---|---|---|
| 7,292,552 B2 * | 11/2007 | Willenegger et al. | 370/333 |
| 7,643,842 B2 * | 1/2010 | Chen et al. | 455/522 |
| 7,734,257 B2 * | 6/2010 | Chen et al. | 455/69 |
| 7,738,902 B2 * | 6/2010 | Murata et al. | 455/522 |
| 2003/0036403 A1 | 2/2003 | Shiu et al. | |

FOREIGN PATENT DOCUMENTS

| | | |
|---|---|---|
| EP | 1 455 465 A2 | 9/2004 |
| WO | 00/48335 A1 | 8/2000 |

* cited by examiner

CONTROLLING A POWER LEVEL IN A WIRELESS COMMUNICATIONS SYSTEM WITH DIFFERENT SCRAMBLING CODES

CROSS-REFERENCE TO RELATED APPLICATIONS

This application claims priority under 35 U.S.C. §119 to European Patent Application No. 06388027.2, filed Apr. 12, 2006, which is hereby incorporated herein by reference in its entirety. This application also claims the benefit of U.S. Provisional Application No. 60/744,673, filed Apr. 12, 2006, which is hereby incorporated herein by reference in its entirety.

TECHNICAL FIELD OF THE INVENTION

The invention relates to a method for controlling a power level of signals transmitted from a first transceiver to a second transceiver in a wireless communications system, wherein said signals are transmitted under use of one of at least a first and a second scrambling code. The method comprises the steps of, in an inner power control loop estimating repetitively a quality measure for signals received in the second transceiver; generating a power control command in dependence on said quality measure and a quality measure reference value; transmitting the power control command to the first transceiver; and adjusting in the first transceiver said power level in dependence on the power control command; and in an outer power control loop calculating a performance level for signals received in the second transceiver during a time interval; and adjusting said quality measure reference value in dependence on said performance level. The invention further relates to a method of generating power control commands in a transceiver for receiving signals transmitted from a remote transceiver in a wireless communications system, to a transceiver for receiving signals from a remote transceiver in a wireless communications system, and to a corresponding computer program and computer readable medium.

DESCRIPTION OF RELATED ART

In wireless communications systems the physical channel between a transmitter and a receiver is typically formed by a radio link. As an example, the transmitter could be a base station, and the receiver could be a mobile station, or vice versa. In that case the base station typically corresponds to a cell of the system. Since the transmit antenna is not narrowly focused towards the receiver, the transmitted signals may propagate over multiple paths. In addition to a possible direct path from the transmitter to the receiver, many other propagation paths caused by reflections from objects in the surroundings exist. Thus, the receiver may receive multiple instances of the same signal at different times, i.e. with different delays, because different portions of the signal are reflected from various objects, such as buildings, moving vehicles or landscape details. The radio link between a base station and a mobile terminal is a two-way link, i.e. information is transmitted from the base station to the mobile terminal (downlink) as well as from the mobile terminal to the base station (uplink).

Many transmission systems try to reduce the effect of multipath propagation and fading by using receivers that combine the data symbol energy from all multipath components. In Code Division Multiple Access (CDMA) and Wideband Code Division Multiple Access (WCDMA) systems the energy of the different received portions of the signal may be utilized in the receiver by using e.g. a RAKE receiver.

In these systems spreading and despreading are used. Data are transmitted from the transmitter side using a spread spectrum modulation technique wherein the data are scattered across a wide range of frequencies. The spreading of each channel comprises a channelisation operation followed by a scrambling operation. In the channelisation operation each data symbol is transformed into a number of so-called chips by multiplying with a channelisation code composed of a binary sequence of 1's and 0's. The number of chips per data symbol is called the spreading factor (SF). Channelisation codes are normally Orthogonal Variable Spreading Factor (OVSF) with spreading factors up to 512. The OVSF scheme is a kind of a code tree, where each level in the tree is a set of codes that are mutually orthogonal and corresponds to a given spreading factor. In the scrambling operation the spread sequence of chips is then scrambled by multiplying the chips by a complex-valued scrambling code, which is a pseudo noise code. The scrambling code is mainly used for separating base stations or cells from each other, while the channelisation codes are used for separating different physical channels (terminals or users) in each cell. In the receiver the received signal is then despread and demodulated using the same codes to recover the transmitted data.

In a timing structure for a WCDMA system, the chips are transmitted in Transmission Time Intervals (TTI), each consisting of 1 to 8 radio frames. Each radio frame has a duration of 10 ms and is split into 15 slots. A slot contains 2560 chips. Thus a TTI may contain from 15 to 120 slots. A TTI may also be divided into a number of Transport Blocks having a variable duration depending on the information to be transmitted.

For downlink transmission, the possible scrambling codes are divided into sets of a primary scrambling code and 15 corresponding secondary scrambling codes. Each cell of the system is allocated one primary scrambling code and the corresponding 15 secondary scrambling codes. Some physical channels, such as the Common Pilot Channel (CPICH), of a given link between a transmitter and a receiver in a cell are always transmitted using the primary scrambling code allocated to that cell, while other physical channels, such as the Dedicated Physical Channel (DPCH), may be transmitted with either the primary scrambling code or one of the corresponding secondary scrambling codes, i.e. a secondary scrambling code from the set associated with the primary scrambling code of the cell. Thus for these physical channels shifts will occur between the primary scrambling code and one of the secondary scrambling codes, since some radio frames are transmitted using the primary scrambling code and other radio frames are transmitted using the secondary scrambling code. The secondary scrambling code may e.g. be used for DPCHs, when the channelisation code tree is full for the primary scrambling code, although transmission capacity is still available in the transmitter.

Another example of shifts between different scrambling codes occurs when a mobile station enters a so-called compressed mode, in which alternative scrambling codes may be used. Two alternative scrambling codes are associated with each of the primary and secondary scrambling codes, and they are designated for use in the compressed mode. Compressed mode occurs when some slots of a frame are allocated for the mobile station to make necessary measurements on different carrier frequencies during inter-frequency handover. Thus in a compressed frame fewer slots are available for normal transmission due to the transmission gap used for the measurements. To compensate for this, the spreading factor may be reduced, but a change in spreading factor is most likely to require a reallocation of several or all channelisation codes in the code tree to maintain the orthogonality. To avoid this reallocation the transmitter may instead switch to an alternative scrambling code corresponding to a different code tree. Since the correlations of the scrambling codes are noise-like, the correlations of the channelisation codes even under the same branch of the code tree are still rather low if they are under different scrambling codes.

In such wireless communications systems power control is employed to compensate for variations in the channel (such as propagation delays and fading effects) and to ensure that an acceptable transmission quality for all users in the system is maintained.

Typically, closed power control loops are used, which adjust the transmitted power level in order to maintain a quality measure for the received signals at a given target value. A closed power control loop for WCDMA, uplink or downlink, typically comprises elements to form a relatively fast inner power control loop and a relatively slow outer power control loop in a receiver of a device in the wireless communication system. In the following reference is made to downlink transmission, i.e. transmission from a base station to a mobile terminal or user equipment (UE), but similar control loops are used for uplink transmission.

The inner loop calculates a Signal-to-Interference Ratio (SIR) value once a slot and then compares it (or the filtered value) with a SIR reference value (target SIR). If the estimated SIR is smaller than the reference, the user equipment will send Transmit Power Control (TPC) commands via the uplink Dedicated Physical Control Channel (DPCCH) to ask the base station to increase the transmission power for the downlink Dedicated Physical Channel (DPCH). On the other hand, if the estimated SIR is larger than the reference, the user equipment will ask the base station to decrease the transmission power. The transmission power update can be performed every slot or once every three slots and the power change steps are by default 1.0 dB with the options of 0.5, 1.5 or 2.0 dB.

The outer loop power control of WCDMA receivers determines the SIR references by using the relations between the estimated Block Error Rate (BLER) and a BLER target. The BLER can be estimated by doing a Cyclic Redundancy Check (CRC) on each Transport Block (TB) to get a flag of 0 or 1 for a correctly or incorrectly received block, and then effectively filtering over a certain amount of Transmission Time Intervals (TTIs) to get the filtered BLER. The momentary BLER for the present TTI can be estimated as the ratio of the number of the erroneous Transport Blocks to the total Transport Blocks of the TTI. The estimated BLER values are then compared with the BLER target.

Basically speaking, the outer loop power control attempts to adjust the SIR reference by comparing the estimated BLER and the BLER target. If the estimated BLER is higher than the pre-determined BLER target, the SIR reference is increased for the next TTI so as to get more power from the BS, and hence mitigate the block errors. Likewise, if the estimated BLER is lower than the BLER target, the SIR reference is decreased so that BS does not need to put too much power on the targeted user equipment. Thus at the end of each TTI a new SIR reference is calculated based on the estimated BLER for that TTI, and this new SIR reference is then used by the inner loop during the next TTI.

As mentioned above, the physical channels of a link between a transmitter and a receiver in a wireless communications system are normally transmitted under the same scrambling code, i.e. the primary scrambling code allocated to the cell, but there are situations where a secondary scrambling code may be used for some channels (e.g. for the DPCH) for some radio frames, while the primary scrambling code is used for other radio frames, or where an alternative scrambling code is used for compressed frames, while the original primary or secondary scrambling code is used for normal frames.

However, this switching between scrambling codes causes trouble for the for the power control, because the SIR reference calculated for signals received under one scrambling code has proven not to be optimal for signals received under a different scrambling code. Thus the switching between scrambling codes results in a SIR reference that is not optimal for any of the two scrambling codes. Typically, an increased amount of block errors will occur, so that the SIR reference is increased to a higher level than actually needed. The end result is a waste in transmission power.

In the compressed mode case mentioned above, it is known, e.g. from WO 00/48335 to increase the transmitted power during a compressed frame in order to compensate for the loss of transmission power during the transmission gap. Simultaneously, the power control threshold in the receiver is increased, so that the power control loop will continue to work, just at a higher power level. Although this system would improve the power control in compressed mode if the scrambling code was not changed during the compressed frame, it does not take the switching between scrambling codes into consideration, since the power control threshold is just increased by a fixed value calculated from the length of the transmission gap.

US 2003/0036403 suggests maintaining multiple individual outer loops for different transport formats, such as different lengths of transmitted transport blocks. For each transport format, its associated outer loop attempts to set a target SNIR (Signal-to-Noise-plus-Interference Ratio) such that the specified target BLER is achieved. The multiple individual outer loops form an overall outer loop that operates in conjunction with the inner loop to derive the proper power control commands. However, also this system does not take the problems related to different scrambling codes into account.

Therefore, it is an object of the invention to provide a method that improves the power control in a wireless communications system when shifts between different scrambling codes occurs in the transmission, so that the transmitted power and/or the number of transmission errors in this situation can be decreased.

SUMMARY

According to the invention the object is achieved in that the method further comprises the steps of adjusting in said outer loop selectively first and second quality measure reference values, wherein said first quality measure reference value is adjusted in dependence on a performance level calculated for time intervals in which all signals are transmitted under use of said first scrambling code, and said second quality measure reference value is adjusted in dependence on a performance level calculated for time intervals in which at least some signals are transmitted under use of said second scrambling code; and using, as the quality measure reference value in said step of generating a power control command, said first quality measure reference value during time intervals in which all signals are transmitted under use of said first scrambling code, and said second quality measure reference value during at least a part of time intervals in which at least some signals are transmitted under use of said second scrambling code.

When two separate quality measure reference value are maintained in the outer power control loop and the most appropriate one of them is used in the inner power control loop at a given time in dependence of the scrambling code used, it is possible to adapt the power control to the shifts between different scrambling codes, so that the total transmitted power can be reduced without sacrificing the required level of performance, i.e. without increasing the amount of transmission errors.

As mentioned, the invention also relates to a corresponding method of generating power control commands in a transceiver for receiving signals transmitted from a remote transceiver in a wireless communications system.

In an embodiment of the invention, the signals are transmitted in a Wideband Code Division Multiple Access system. In that case, the quality measure may be estimated as a Signal-to-Interference Ratio, and the performance level may be calculated as a Block Error Rate.

In one embodiment said first scrambling code may be a primary scrambling code and said second scrambling code may be a secondary scrambling code. Alternatively, said first scrambling code may be one of a primary and a secondary scrambling code and said second scrambling code may be an alternative scrambling code.

When the second scrambling code is an alternative scrambling code, and when said time interval is a Transmission Time Interval comprising a number of frames, each Transmission Time Interval in which at least some signals are transmitted under use of said second scrambling code may comprise at least one frame in which the signals are transmitted in a compressed mode under use of said alternative scrambling code.

When said second quality measure reference value is used as the quality measure reference value in all frames of a Transmission Time Interval in which at least some signals are transmitted under use of said second scrambling code, a simple solution is achieved in which only one quality measure reference value is used in each Transmission Time Interval. One quality measure reference value is used for Transmission Time Intervals having only the first scrambling code, and the other one for Transmission Time Intervals having a mixture of scrambling codes or only the second scrambling code.

In an alternative embodiment, said second quality measure reference value is used as the quality measure reference value in compressed mode frames of a Transmission Time Interval in which at least some signals are transmitted under use of said second scrambling code, while said first quality measure reference value is used as the quality measure reference value in other frames of such Transmission Time Interval. In this way additional power may be saved, since the first quality measure reference value, which is typically the lower one, is also used in those frames of mixed Transmission Time Intervals which are transmitted under the first scrambling code.

The method may further comprise the steps of adjusting, in addition to said second quality measure reference value, at least one further quality measure reference value in dependence on a performance level calculated for time intervals in which at least some signals are transmitted under use of said second scrambling code, wherein each of said second and further quality measure reference value is adjusted for different amounts of signals transmitted under use of said second scrambling code; and using, as the quality measure reference value in the step of generating a power control command, during at least a part of time intervals in which at least some signals are transmitted under use of said second scrambling code, one of said second and further quality measure reference value in dependence of the amount of signals transmitted under use of said second scrambling code. In this way the method can better adapt to different amounts of signals transmitted under use of said second scrambling code.

As mentioned, the invention also relates to a transceiver for receiving signals transmitted from a remote transceiver in a wireless communications system under use of one of at least a first and a second scrambling code, said transceiver comprising a controller for generating power control commands, said controller comprising means for estimating repetitively a quality measure for signals received in the transceiver; means for generating a power control command in dependence on said quality measure and a quality measure reference value; means for transmitting the power control command to the remote transceiver; means for calculating a performance level for signals received in the transceiver during a time interval; and means for adjusting said quality measure reference value in dependence on said performance level.

When said adjusting means is arranged to adjust selectively first and second quality measure reference values, so that said first quality measure reference value is adjusted in dependence on a performance level calculated for time intervals in which all signals are transmitted under use of said first scrambling code, and said second quality measure reference value is adjusted in dependence on a performance level calculated for time intervals in which at least some signals are transmitted under use of said second scrambling code; and said generating means is arranged to use, as the quality measure reference value, said first quality measure reference value during time intervals in which all signals are transmitted under use of said first scrambling code, and said second quality measure reference value during at least a part of time intervals in which at least some signals are transmitted under use of said second scrambling code, a transceiver is achieved that improves the power control in a wireless communications system when shifts between different scrambling codes occurs in the transmission, so that the transmitted power and/or the number of transmission errors in this situation can be decreased.

In an embodiment of the invention, the transceiver is arranged to receive signals that are transmitted in a Wideband Code Division Multiple Access system. In that case, the estimating means may be arranged to estimate said quality measure as a Signal-to-Interference Ratio, and the calculating means may be arranged to calculate said performance level as a Block Error Rate.

In one embodiment said first scrambling code is a primary scrambling code and said second scrambling code is a secondary scrambling code. Alternatively, said first scrambling code is one of a primary and a secondary scrambling code and said second scrambling code is an alternative scrambling code.

When the second scrambling code is an alternative scrambling code, and when said time interval is a Transmission Time Interval comprising a number of frames, the transceiver may be arranged to receive signals wherein each Transmission Time Interval in which at least some signals are transmitted under use of said second scrambling code comprises at least one frame in which the signals are transmitted in a compressed mode under use of said alternative scrambling code, When said generating means is arranged to use said second quality measure reference value as the quality measure reference value in all frames of a Transmission Time Interval in which at least some signals are transmitted under use of said second scrambling code, a simple solution is achieved in which only one quality measure reference value is used in each Transmission Time Interval. One quality measure reference value is used for Transmission Time Intervals having only the first scrambling code, and the other one for Transmission Time Intervals having a mixture of scrambling codes or only the second scrambling code.

In an alternative embodiment, said generating means is arranged to use said second quality measure reference value as the quality measure reference value in compressed mode frames of a Transmission Time Interval in which at least some signals are transmitted under use of said second scrambling code, and to use said first quality measure reference value as the quality measure reference value in other frames of such Transmission Time Interval. In this way additional power may be saved, since the first quality measure reference value, which is typically the lower one, is also used in those frames of mixed Transmission Time Intervals which are transmitted under the first scrambling code.

The adjusting means may further be arranged to adjust, in addition to said second quality measure reference value, at least one further quality measure reference value in dependence on a performance level calculated for time intervals in which at least some signals are transmitted under use of said second scrambling code, and to adjust each of said second and further quality measure reference value for different amounts of signals transmitted under use of said second scrambling code; and the generating means may be arranged to use, as the quality measure reference value, during at least a part of time intervals in which at least some signals are transmitted under use of said second scrambling code, one of said second and further quality measure reference value in dependence of the amount of signals transmitted under use of said second scrambling code. In this way the transceiver can better adapt to different amounts of signals transmitted under use of said second scrambling code.

The invention also relates to a computer program and a computer readable medium with program code means for performing the method described above.

BRIEF DESCRIPTION OF THE DRAWINGS

The invention will now be described more fully below with reference to the drawings, in which.

DETAILED DESCRIPTION OF EMBODIMENTS

Figure 1:
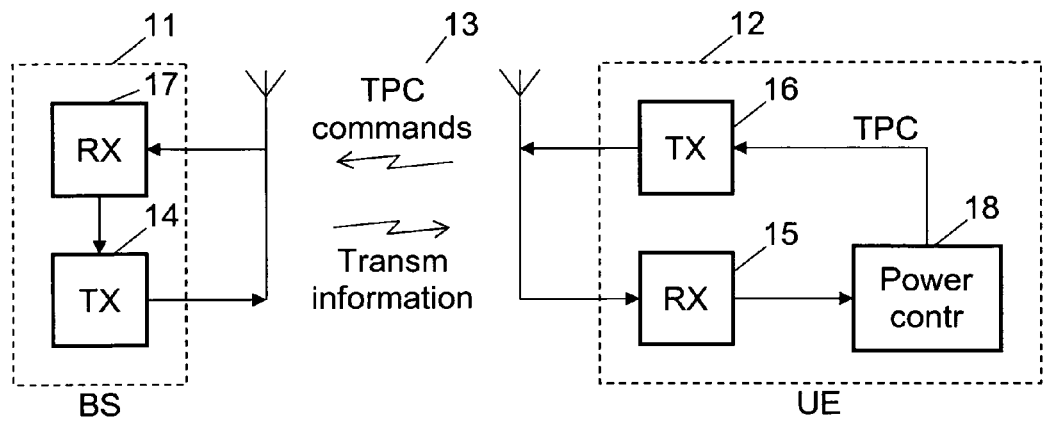
FIG. 1 shows communications between two transceivers in a wireless communications system.

FIG. 1 illustrates the communication between two transceivers 11 and 12 in a wireless communications system, which as an example can be a Wideband Code Division Multiple Access (WCDMA) system, where the two transceivers communicate with each other over a wireless transmission channel 13 with radio signals carrying different kinds of information. The two transceivers can be a base station 11 and a mobile terminal or mobile station 12. The mobile station may also be designated user equipment (UE). The base station 11 may also communicate with other (not shown) mobile stations. Information is transmitted in one direction from the transmitter 14 in the base station 11 via the channel 13 to the receiver 15 in the mobile station 12 (downlink), and in the opposite direction from the transmitter 16 in the mobile station 12 via the channel 13 to the receiver 17 in the base station 11 (uplink). The wireless transmission channel 13 affects the transmitted signals in a random and unknown manner before it is received by the receivers 15 and 17, respectively. Therefore, the receivers process the received signals, e.g. by amplifying, filtering, frequency down converting, sampling, despreading, decoding and de-interleaving the signals in order to form a processed received signal and regenerate the transmitted information.

FIG. 1 also illustrates power control of downlink transmission. Based on the quality of the signals received in the receiver 15, a power control unit 18 in the mobile terminal 12, which will be described in more detail below, generates one or more Transmit Power Control (TPC) commands indicating whether the power level of the transmitter 14 in the base station should be increased or decreased to provide a sufficient quality of the received signals at the mobile terminal. The TPC commands are then transmitted from the transmitter 16 via the channel 13 to the receiver 17 in the base station 11, in which they are processed and used to control the power level of the transmitter 14. Similarly, a power control unit is used in the base station 11 for power control of uplink transmission. However, for clarity reasons this unit is not shown in FIG. 1.

Figure 2:
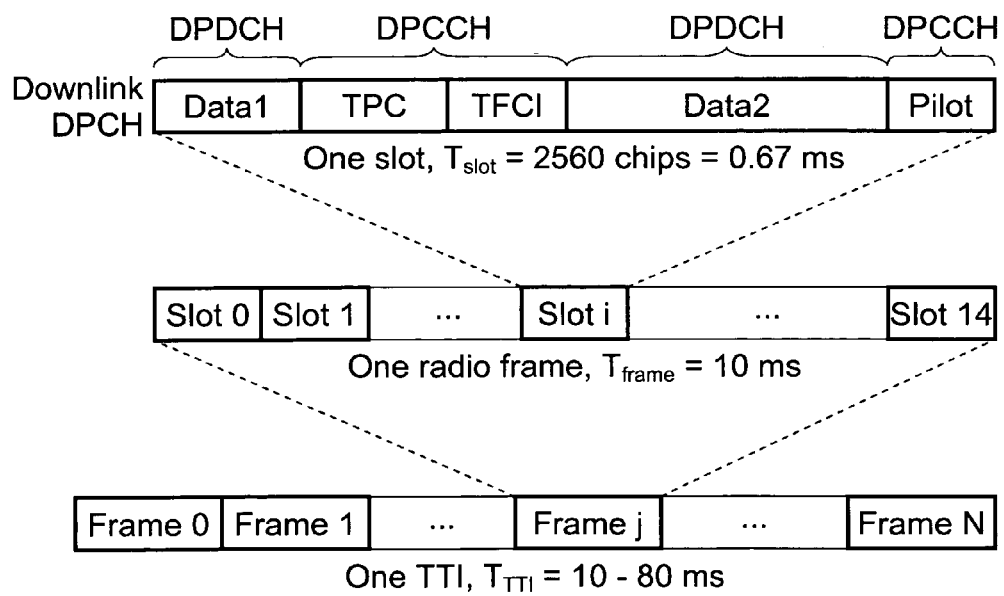
FIG. 2 shows a timing structure for a downlink DPCH of a WCDMA system.

The signals transmitted in the WCDMA system are transmitted according to a well defined timing structure, which in FIG. 2 is illustrated for a downlink Dedicated Physical Channel (DPCH). A Transmission Time Interval (TTI) consists of 1 to 8 radio frames. Each radio frame has a duration of 10 ms and is split into 15 slots. A slot contains 2560 chips, corresponding to one power control period, as it will be described below. Thus a TTI may contain from 15 to 120 slots. On the DPCH, each slot includes two data fields, Data1 and Data2, which together constitute the Dedicated Physical Data Channel (DPDCH), and three control fields, a Transmit Power Control (TPC) field, a Transport Format Combination Indicator (TFCI) field and a pilot field, which together constitute the Dedicated Physical Control Channel (DPCCH). The downlink DPCH can thus be seen as a time multiplex of a downlink DPDCH and a downlink DPCCH. The TPC field is used to transmit the TPC commands mentioned above, but the TPC commands transmitted in the downlink DPCH are of course used for power control of the uplink transmission, while the TPC commands relating to power control of the downlink transmission are transmitted from the transmitter 16 to the receiver 17 in a corresponding TPC field of the uplink DPCCH. The chips of the data fields (and the pilot field) are despread and decoded in the receiver as data symbols corresponding to the original data bits that were spread and encoded in the transmitter. The total number of symbols in a slot is determined by the spreading factor (SF). A TTI may also be divided into a number of Transport Blocks having a variable duration depending on the information to be transmitted.

The power control unit 18 will now be described in more detail with reference to FIG. 3. As mentioned, closed power control loops are used, which adjust the transmitted power level in order to maintain a given quality of the received signals. The control unit 18 comprises elements for a relatively fast inner power control loop and a relatively slow outer power control loop in the receiver of the mobile terminal 12.

In the inner loop a Signal-to-Interference Ratio (SIR) value 51 is calculated in the SIR estimator 23 once a slot. The inputs to the SIR estimator 23 are provided from a power estimator 21, which estimates the signal power of the slot from the dedicated pilot symbols, and an interference estimator 22, which estimates the interference from either the Common Pilot Channel (CPICH) or the dedicated pilot symbols. From these two inputs the SIR can be calculated. The SIR value estimated in the SIR estimator 23 (or a filtered value thereof) is then compared in the inner loop regulator 24 with a SIR reference value 53 (target SIR). If the estimated SIR is smaller than the reference, the inner loop regulator 24 will send Transmit Power Control (TPC) commands via the uplink Dedicated Physical Control Channel (DPCCH) to ask the base station to increase the transmission power for the downlink Dedicated Physical Channel (DPCH). On the other hand, if the estimated SIR is larger than the reference, the inner loop regulator 24 will ask the base station to decrease the transmission power. The transmission power update is performed every slot or once every three slots and the power change steps are by default 1.0 dB with the options of 0.5, 1.5 or 2.0 dB.

The SIR reference value used by the inner loop regulator 24 is determined by the outer loop regulator 26 by using the relations between the estimated Block Error Rate (BLER) for a TTI and a BLER target value. The momentary BLER value 52 for a TTI is estimated in the BLER estimator 25 by doing a Cyclic Redundancy Check (CRC) on each Transport Block (TB) to get a flag of 0 or 1 for a correctly or incorrectly received block. The momentary BLER for the present TTI can then be estimated as the ratio of the number of the erroneous Transport Blocks to the total Transport Blocks of the TTI. Thus, if the user equipment is in the k'th TTI, in which $N_{TB}(K)$ transport blocks are sent from the base station, and $N_{err}(k)$ of them of them are found to be erroneous by performing CRC in the receiver, the momentary BLER for the current TTI is simply:

$$BLER_{mom}(k) = N_{err}(k)/N_{TB}(k). \quad [1]$$

The momentary BLER values (or the CRC flags) can be filtered over a certain amount of TTIs to create the estimated BLER over long time, i.e. the value $BLER_{filt}$.

The estimated BLER values (momentary and/or filtered) are then compared with the BLER target value in the outer loop regulator 26 to obtain an updated SIR reference value. The BLER target value $BLER_{targ}$ is provided by the system. A typical outer loop power control algorithm is based on a generalization of a Proportional Integral controller (PI controller), in which an integral part is calculated as $$I(k) = C_I * I(k-1) + C_B * (BLER_{filt}(k) - BLER_{targ}), \quad [2]$$

and the SIR reference can then be updated for the next TTI, i.e. the (k+1)'th TTI, in terms of $$SIR_{ref}(k+1) = SIR_{ref}(k) + C_S * [BLER_{mom}(k) - BLER_{targ}] + I(k), \quad [3]$$

with the initial value of the integral part I(0) and starting value of the SIR reference $SIR_{ref}(0)$. The constants in the above equations can be different for different BLER target values to accelerate the convergence of the power control, especially for low BLER target values.

Thus the outer loop power control attempts to adjust the SIR reference by comparing the estimated BLER and the BLER target. If the estimated BLER for a TTI is higher than the pre-determined BLER target value, the SIR reference is increased for the next TTI so as to get more power from the base station, and hence mitigate the block errors. Likewise, if the estimated BLER is lower than the BLER target, the SIR reference is decreased so that the base station does not need to put too much power on the targeted user equipment. Thus at the end of each TTI a new SIR reference is calculated based on the estimated BLER for that TTI, and this new SIR reference is then used by the inner loop during the next TTI.

Figure 4:
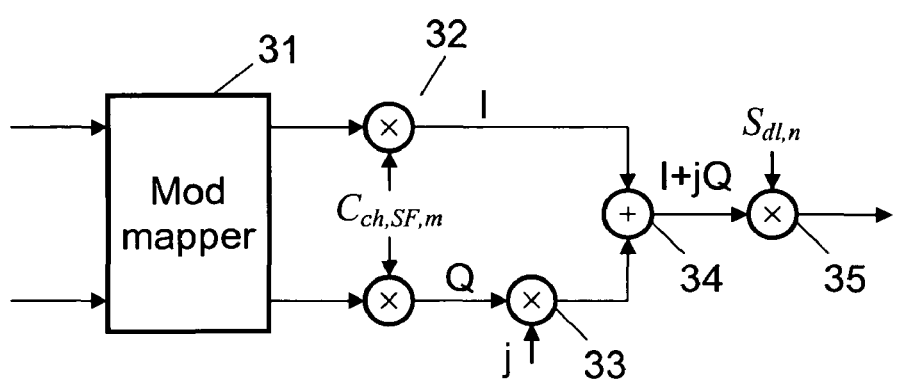
FIG. 4 illustrates a spreading operation in a transmitter of the system of FIG. 1.

As mentioned, the downlink data are spread before they are transmitted from the transmitter 14 in the base station 11. The spreading operation in the transmitter is illustrated in FIG. 4. It includes a modulation mapper stage 31, in which the input digits are mapped to real-valued symbols, i.e. the binary value "0" is mapped to the real value +1, while the binary value "1" is mapped to the real value −1. Next, in a channelisation stage 32 the data in the I-Q format (inphase and quadrature) are spread to the chip rate by multiplying by a real-valued channelisation code $C_{ch,SF,m}$, where SF is the spreading factor. The same channelisation code is used in the I branch as well as the Q branch. Thus the output for each input symbol on the I and the Q branches will be a sequence of SF chips corresponding to the channelisation code chip sequence multiplied by the real-valued symbol. The channelisation code will be described in more detail in the following.

The real valued chip sequence on the Q branch is then complex multiplied with the imaginary operator j in the multiplier 33 and summed with the corresponding real valued chip sequence on the I branch in the IQ combiner 34, thus resulting in a single complex valued chip sequence. Finally, in the scrambling stage 35, the sequence of complex valued chips is scrambled (complex chip-wise multiplication) by a complex-valued scrambling code $S_{dl,n}$.

Figure 5:
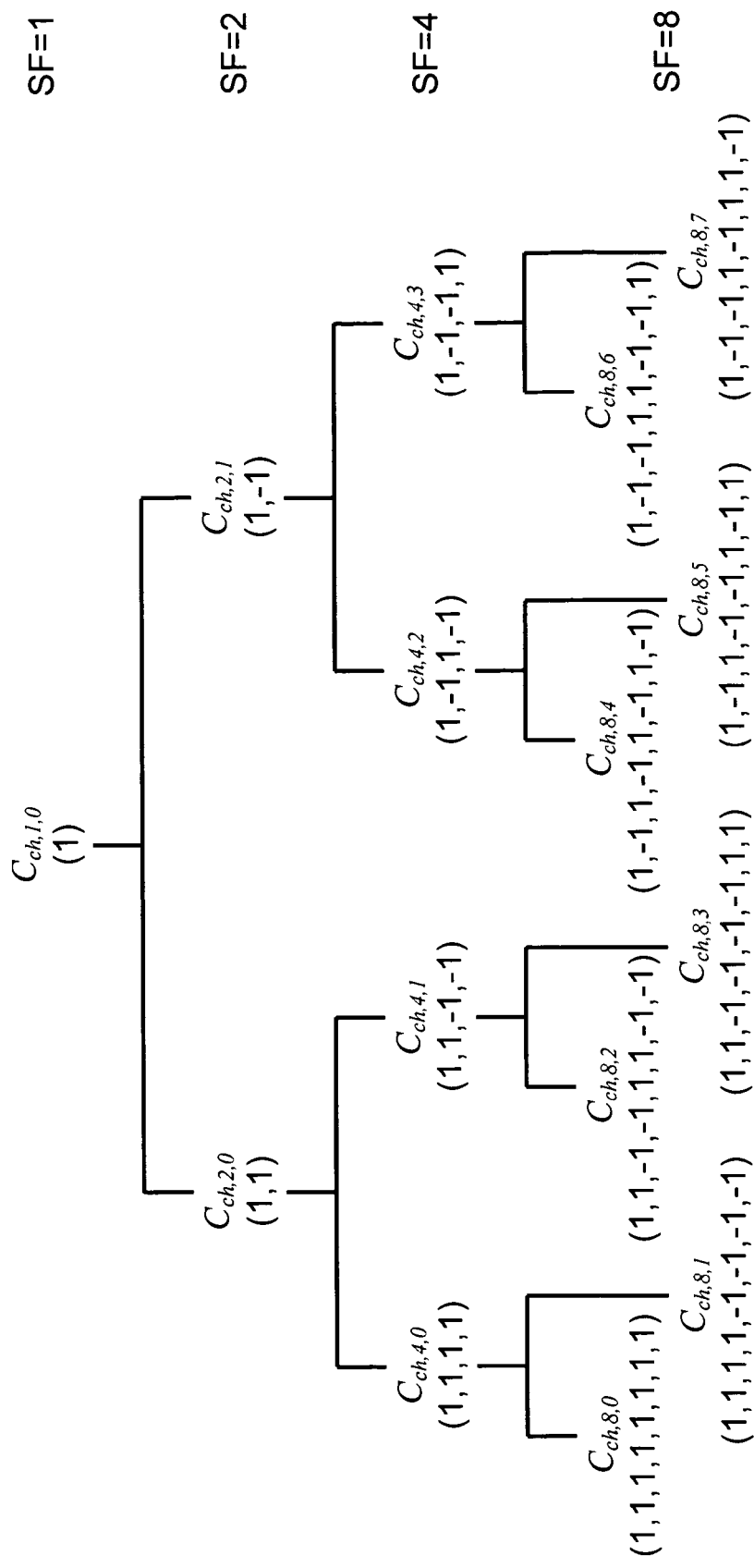
FIG. 5 shows a code tree for OVSF channelisation codes of a WCDMA system.

The channelisation codes are Orthogonal Variable Spreading Factor (OVSF) codes that preserve orthogonality between different physical channels. The spreading factor can be up to 512. The OVSF codes are defined according to a coding tree as illustrated in FIG. 5. The code tree first split into two branches with SF =2, and then each of these further splits into two branches with SF =4. This continues until the branches with SF =512 are reached. As shown in FIGS. 4 and 5, the channelisation codes are uniquely described as $C_{ch,SF,m}$, where SF is the spreading factor of the code and m is the code number, $0 \leq m \leq SF - 1$. The channelisation codes under different branches are orthogonal, even if they have different spreading factors, whereas the channelisation codes are not orthogonal to their original codes. For instance, $C_{ch,4,0}=(1,1,1,1)$ is orthogonal to $C_{ch,4,1}=(1,1,-1,-1)$ as well as $C_{ch,4,2}=(1,-1,1,-1)$, $C_{ch,4,3}=(1,-1,-1,1)$ and even $C_{ch,2,1}=(1,-1)$, but it is not orthogonal to $C_{ch,2,0}=(1,1)$. Therefore, if a channelisation code is assigned in a given code tree, all the codes under that code with higher spreading factor should not be used in order to ensure the orthogonality. As a consequence of the orthogonality requirement, the number of available channelisation codes under a code tree is rather limited, especially for higher data rates, i.e. small spreading factors.

The scrambling codes are, as mentioned, complex-valued codes $S_{dl,n}$, by which the sequence of complex valued chips is complex chip-wise multiplied in the scrambling stage 35. Although a very high number of different scrambling codes could be generated, they are not all used. The scrambling codes are divided into 512 sets, each set comprising a primary scrambling code and 15 secondary scrambling codes. The primary scrambling codes consist of scrambling codes n=16*i, where i=0 . . . 511. The i'th set of secondary scrambling codes consists of scrambling codes 16*i+k, where k= 1 . . . 15. There is a one-to-one mapping between each primary scrambling code and the 15 secondary scrambling codes in a set such that the i'th primary scrambling code corresponds to the i'th set of secondary scrambling codes. Each cell is allocated one and only one primary scrambling code. Some physical channels, such as the Common Pilot Channel (CPICH), are always transmitted using the primary scrambling code, while other downlink physical channels may be transmitted with either the primary scrambling code or a secondary scrambling code from the set associated with the primary scrambling code of the cell.

Thus 8191 scrambling codes are used as primary or secondary scrambling codes. Further, each primary and secondary scrambling code is associated with two alternative scrambling codes, i.e. a left alternative scrambling code and a right alternative scrambling code, that may be used for compressed frames.

Compressed mode is used in WCDMA when the user equipment during inter-frequency handover needs time to make necessary measurements on different carrier frequencies. To allow the user equipment to perform these measurements some slots of a frame—typically 1 to 7 slots per frame—are allocated to this purpose, so that a transmission gap occur in the frame. Such frames are called compressed frames, since only the remaining slots of the frame are available for the normal transmission of information. Typically, compressed frames occur periodically, but they may also be requested on demand. The rate and type of compressed frames is variable and depends on the environment and measurement requirements.

Figure 6:
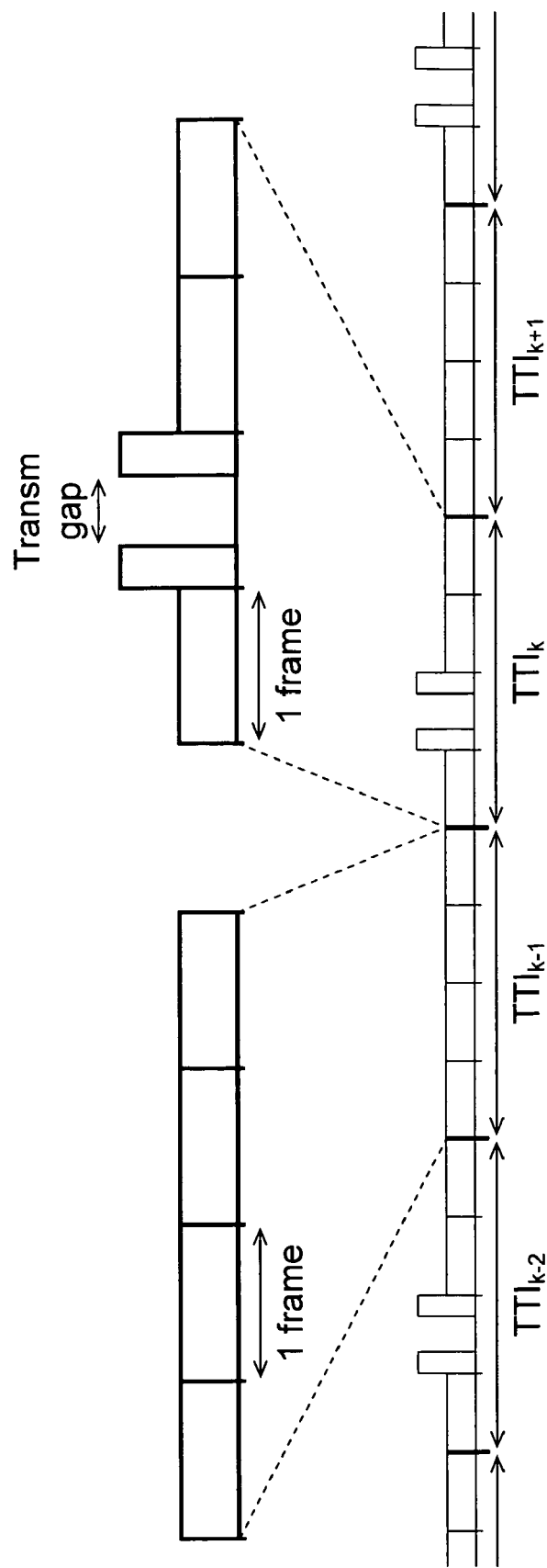
FIG. 6 illustrates the use of compressed mode in a WCDMA system.

FIG. 6 illustrates the compressed mode. In the figure, a series of TTIs, each of which in this case consists of four frames, are transmitted. It is seen that while some TTIs contain four normal frames, other TTIs contain compressed frames. As an example, the second frame of the k'th TTI is compressed with a transmission gap occurring in the middle of the frame. As shown, the instantaneous transmit power is increased for the remaining slots of the compressed frame in order to keep the quality (e.g. the BLER) unaffected by the reduced number of slots. The amount of power increase depends of the transmission time reduction. When e.g. 7 slots are used for the transmission gap, it means that only approximately half of the compressed frame is available for transmission of data. Correspondingly, in FIG. 6 the transmit power of the compressed frame is increased to a level approximately twice the normal power level.

Additionally, in order to maintain the amount of transmitted information, even in a compressed frame, the spreading factor may be reduced by 2:1, because this will increase the data rate, so that data symbols will get sent twice as fast. However, a change in spreading factor is most likely to require a real-location of several or all channelisation codes in the code tree to maintain the orthogonality. Thus, if the base station has to use the channelisation code with spreading factor equal to half of the original spreading factor SF, some of the codes under the branch with SF/2 might already be taken by other channels. As an example, the orthogonality is destroyed if $C_{ch,2,0}$ has to be used for compressed mode instead of the code $C_{ch,4,0}$ for the normal mode and some codes under the branch $C_{ch,4,1}$ are used by other channels. Even if the codes under the branch $C_{ch,4,1}$ are free to use for the normal mode, they will now be blocked due to the compressed mode with spreading factor reductions.

To avoid this reallocation the transmitter may instead switch to an alternative scrambling code for compressed frames, because a different scrambling code means that a channelisation code from another code tree can be used. Since the correlations of the scrambling codes are noise-like, the correlations of the channelisation codes even under the same branch of the code tree are still rather low if they are under different scrambling codes. Thus the compressed frames are transmitted with an alternative scrambling code, while the other frames are transmitted with the normal scrambling code, i.e. the primary or a secondary, scrambling code. Since the compressed frames, as shown in FIG. 6, occur with patterns determined by the network (typically, but not necessarily, the compressed frames will be in the same frame position in those TTIs that have compressed frames), there will be a switching between normal and alternative scrambling codes. Thus for some TTIs all frames will be transmitted with the same scrambling code, while other TTIs are transmitted with a mix of different scrambling codes. A similar situation occurs when the base station in normal mode switches between the primary and one of the secondary scrambling codes. Using more than one code tree allows the base station to provide many users with the data rates as high as possible. As discussed before, base stations need a sufficiently large amount of channelisation code available for this purpose. Therefore, if needed, it is beneficial for the base station to use a secondary scrambling code in addition to the primary scrambling code, and switches between scrambling codes will occur.

The fact that some TTIs are transmitted with the same scrambling code for all frames, while other TTIs are transmitted with a mix of different scrambling codes, causes trouble for the for the power control, because the SIR reference calculated for signals received under one scrambling code has proven not to be optimal for signals received under a different scrambling code. Thus the switching between scrambling codes results in a SIR reference that is not optimal for any of the two scrambling codes. Typically, an increased amount of block errors will occur, so that the SIR reference is increased to a higher level than actually needed. The end result is a waste in transmission power.

Figure 7:
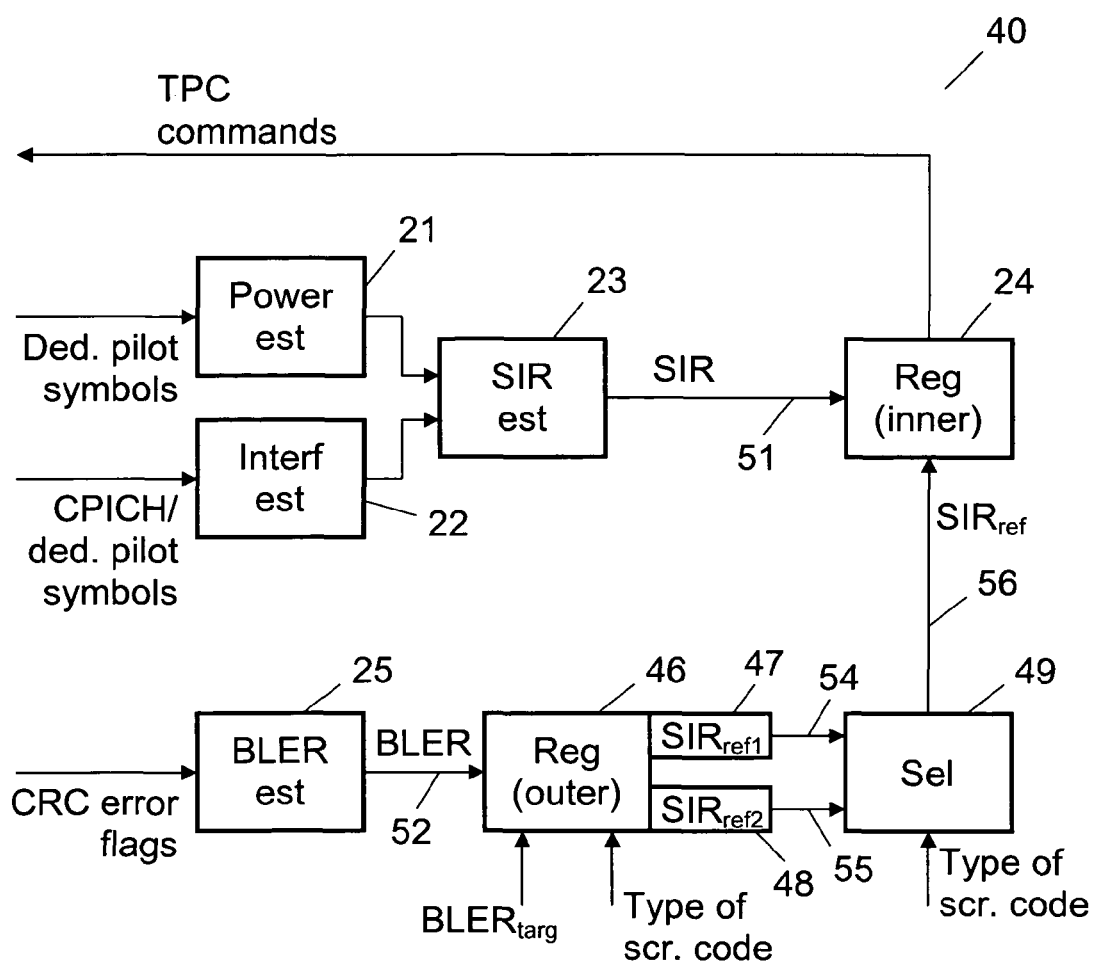
FIG. 7 shows a power control unit modified to maintain two separate SIR references.

FIG. 7 shows an example of how the power control unit 18 can be modified to improve the power control in this situation. In the modified power control unit 40 the power control is done independently for the two types of TTIs, i.e. those in which all frames are transmitted with the same scrambling code and those containing frames transmitted with different scrambling codes. In the description below the modified power control unit 40 is described with reference to the compressed mode situation mentioned above, where some frames are transmitted under an alternative scrambling code, but the same solution can be used when the base station switches between the primary and one of the secondary scrambling codes.

Figure 3:
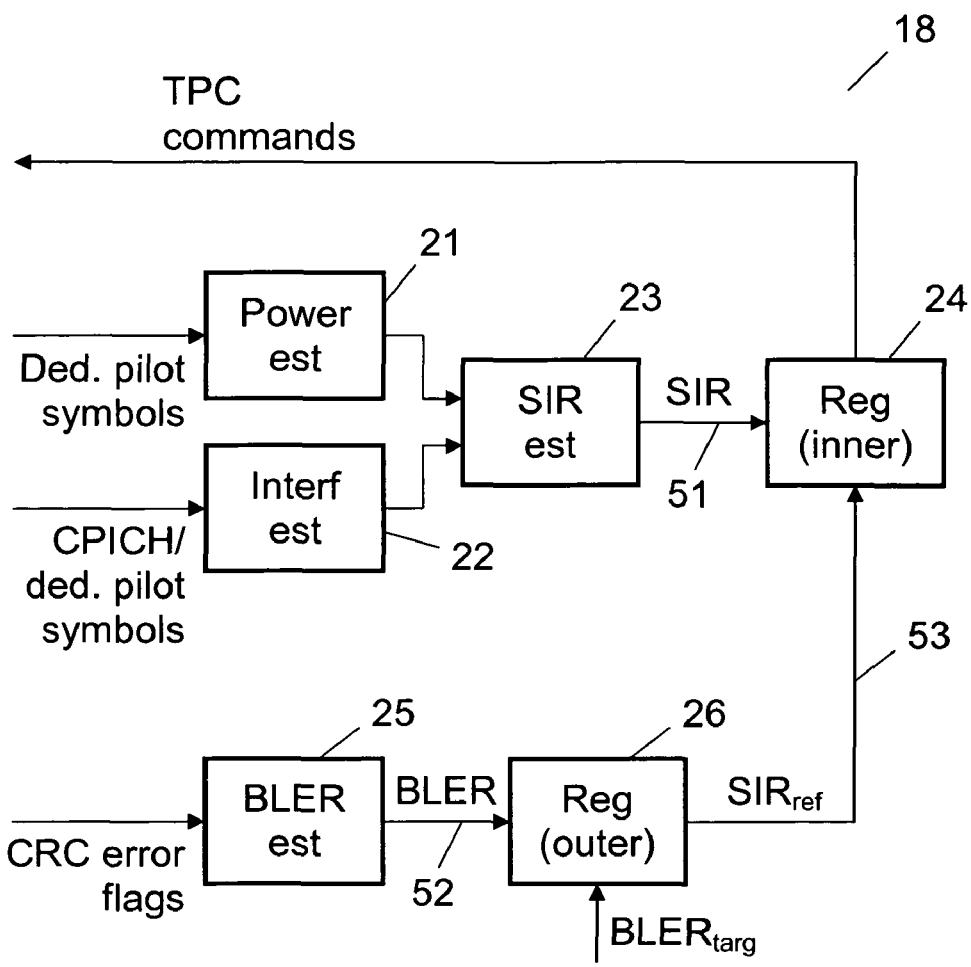
FIG. 3 shows a known power control unit for a transceiver of the system of FIG. 1.

Compared to the power control unit 18 of FIG. 3, the elements for the outer power control loop have been modified in the power control unit 40. The BLER estimator 25 still estimates a BLER value 52 for each TTI, but the outer loop regulator 46 now updates two different SIR references 54, 55, i.e. $SIR_{ref1}$ for TTIs where all frames are in normal mode and scrambled with the primary (or a secondary) scrambling code and $SIR_{ref2}$ for TTIs where at least one frame is in compressed mode and scrambled with an alternative scrambling code. The two SIR references are stored in the registers 47 and 48, respectively. An input indicating the type of scrambling code used in the current TTI to the outer loop regulator 46 determines which SIR reference to update. Thus at the end of e.g. a TTI where all frames are in normal mode $SIR_{ref1}$ is updated based on the BLER estimated for that TTI and the previous value of $SIR_{ref1}$, which has not necessarily been calculated for the immediately preceding TTI, since there may have been TTIs with compressed frames in between. Similarly, $SIR_{ref2}$ is updated at the end of TTIs where at least one frame is in compressed mode. Thus the outer loop power control algorithm, in terms of which the SIR references are updated, may now be written as $$I(k)=C_I*I(k-1)+C_B*(BLER_{filt}(k)-BLER_{targ}) \quad [4]$$

and $$SIR_{ref}(k+m)=SIR_{ref}(k)+C_S*[BLER_{mom}(k)-BLER_{targ}]+I(k), \quad [5]$$

again with the initial value of the integral part I(0) and starting value of the SIR reference $SIR_{ref}(0)$, and where m indicates that the SIR reference calculated at the end of the k'th TTI is not necessarily used for the immediately following TTI.

The constants used in equations [4] and [5], i.e. $C_I$, $C_B$ and $C_S$, may be different for the compressed mode under alternative scrambling code and the normal mode in order to optimize the performance. Alternatively, the same constants may be used for both modes, so that the only difference between normal and compressed mode is that the old SIR references $SIR_{ref}(k)$ in equation [5] are different for the two modes, and the updated SIR references are only applied for the next TTI with the same mode.

In the SIR reference selector 49, an input indicating the type of scrambling code used in the current/coming TTI determines which of the two SIR references to use as the SIR reference 56 in the inner loop regulator 24 for this TTI. This input signal is based on information received from the base station.

Figure 8:
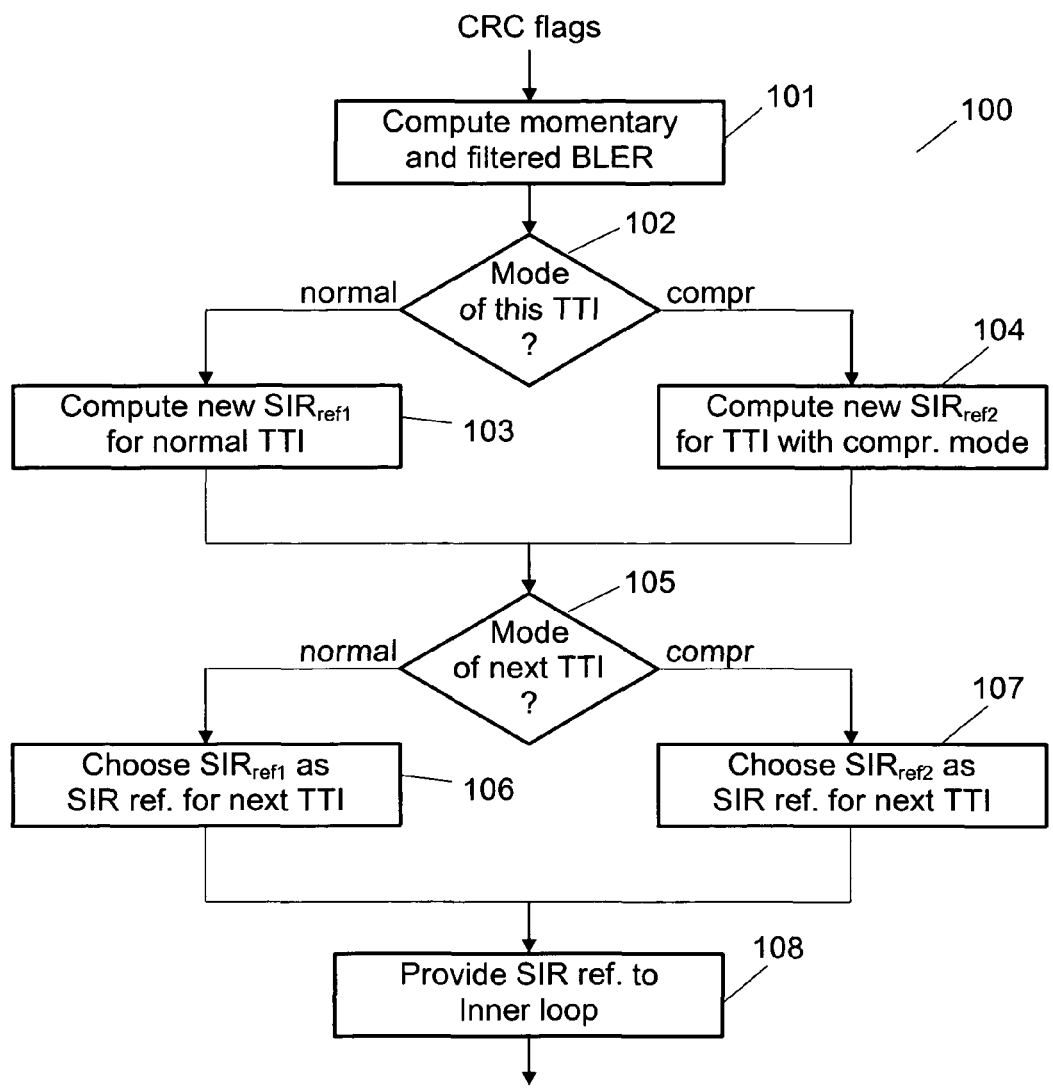
FIG. 8 shows a flowchart illustrating the calculations performed in the control unit of FIG. 7.

FIG. 8 shows a flow chart 100 illustrating the calculations performed in the BLER estimator 25, the outer loop regulator 46 and the SIR reference selector 49. In step 101 the momentary and the filtered BLER values are calculated at the end of a TTI from the CRC flags for this TTI. In step 102 it is decided if this TTI only contained normal frames, or if compressed frames were included. If all frames of the TTI were normal mode, the SIR reference value $SIR_{ref1}$ is updated in step 103. If, on the other hand, compressed frames were included, the SIR reference value $SIR_{ref2}$ is updated in step 104. In step 105 it is then decided if the next TTI only contains normal frames, or if compressed frames will be included. If all frames of the next TTI are normal mode, the value $SIR_{ref1}$ will be selected as the SIR reference in step 106. If, on the other hand, compressed frames are included in the next TTI, the value $SIR_{ref2}$ will be selected as the SIR reference in step 107. Finally, the selected SIR reference value is provided to the inner loop regulator 24 in step 108.

Figure 9:
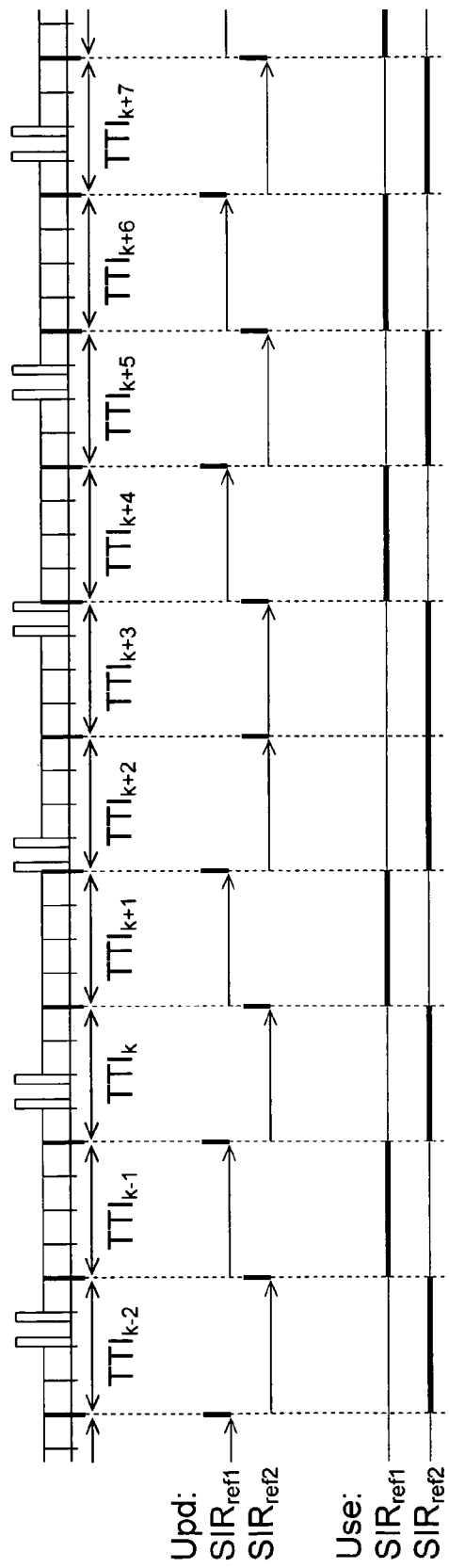
FIG. 9 illustrates an example of how two SIR references are updated and used during a series of TTIs.

FIG. 9 illustrates how the two SIR references are updated and used during a series of TTIs of which some have all frames in normal mode, while others include compressed frames. For illustrational purposes, the TTIs are shown in the figure as having four frames each, although the number of frames in a TTI may vary between one and eight. As an example, $TTI_k$ includes a compressed frame, and thus during this TTI the inner loop regulator uses $SIR_{ref2}$ as the SIR reference for the inner loop. At the end of $TTI_k$ $SIR_{ref2}$ is updated based on the BLER value estimated for this TTI. This updated value of $SIR_{ref2}$ is then used in $TTI_{k+2}$, which also includes a compressed mode frame, while $SIR_{ref1}$ is used during $TTI_{k+1}$, in which all frames are in normal mode.

Figure 10:
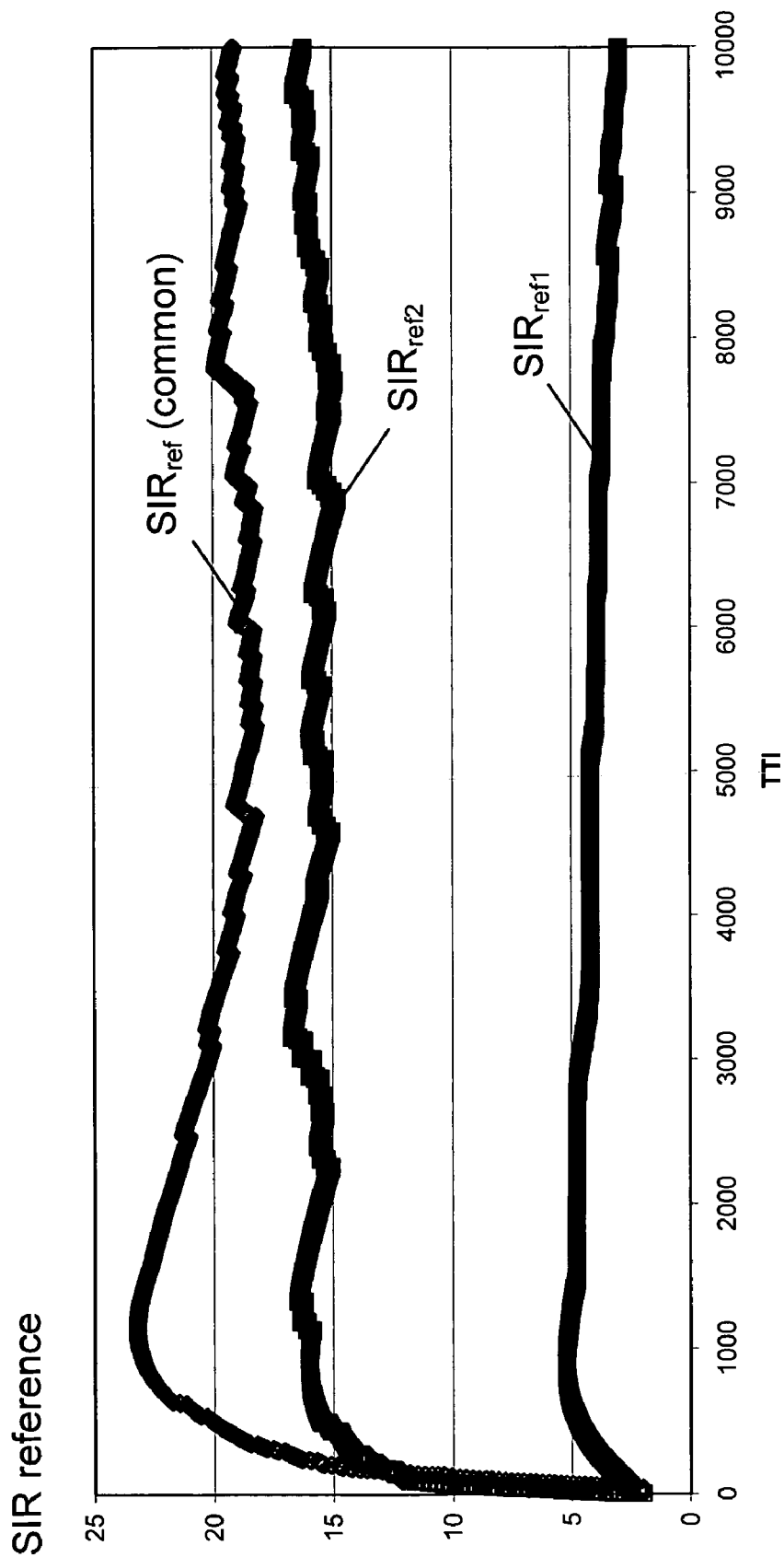
FIG. 10 illustrates the effect of using two separate SIR references.

FIG. 10 illustrates the effect of doing the power control independently for the two types of TTIs. The curves show the level of the SIR references during the course of power control time, i.e. over a high number of TTIs, when an alternative scrambling code is used for the DPCH during the compressed frames, and they are the results simulations, in which the constants of equations [4] and [5] were set to $C_I$=0, $C_B$=0.25 and $C_S$=0.25, and the BLER target was set to 1%. The upper curve is for the case where only one common SIR reference is updated for both normal TTIs and TTIs with compressed frames, while the two lower curves are for the case where two separate SIR references are updated for TTIs in which all frames are in normal mode ($SIR_{ref1}$) and TTIs that include compressed frames ($SIR_{ref2}$), respectively. It is seen that in the latter case, the two SIR references separate themselves automatically during the course of power control time. Further, compared with the situation with only one common SIR reference, the overshoots are diminished and the converged SIR references become less noisy. From the curves it can be seen that if all TTIs were transmitted under e.g. the primary scrambling code, the known solution with only one SIR reference being updated would after e.g. 5000 TTIs have a SIR reference around 4. If, however, there was a switching between scrambling codes, that solution would instead have a SIR reference around 19 under the same channel conditions with the amount of transmitted power being increased correspondingly. On the other hand, the solution with two separate SIR references being updated would, as it can be seen from the figure, maintain the SIR reference around 4 for TTIs containing only frames transmitted under the original scrambling code, while the separate SIR reference for TTIs including frames transmitted under an alternative scrambling code would be around 16. This means that a considerable amount of transmission power can be saved without degrading the BLER. The simulation showed that under these conditions, the mean transmitted power level could be reduced when using two separate SIR references instead of one, while at the same time the estimated BLER was reduced.

Figure 11:
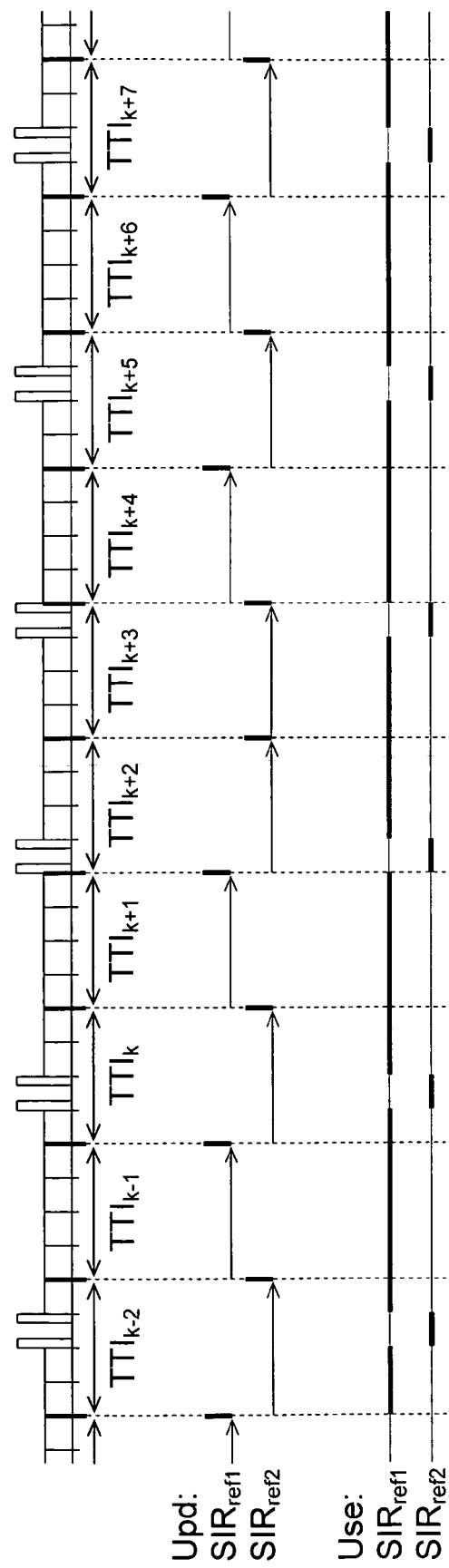
FIG. 11 illustrates an alternative example of how two SIR references are updated and used during a series of TTIs.

In the solution describe above, one of the two separately updated SIR references, i.e. $SIR_{ref1}$, is used in the inner loop regulator 24 during TTIs having all frames in normal mode, while the other, i.e. $SIR_{ref2}$, is used for TTIs having a mixture of normal and compressed frames, as it is also shown in FIG. 9. However, during the latter type of frames, it would also be possible to switch between the SIR references such that $SIR_{ref1}$ is used for the normal frames and $SIR_{ref2}$ only for the compressed frames. This is shown in FIG. 11. As also shown in the figure, the two SIR references are still updated as described above, i.e. $SIR_{ref1}$ is updated at the end of TTIs having only normal frames, while $SIR_{ref2}$ is updated at the end of TTIs having at least one compressed frame. In this way the transmitted power can be reduced further, since the lower $SIR_{ref1}$ is used for all normal frames and the higher $SIR_{ref2}$ only for the compressed frames.

In the example described above, a two state model has been used, in which one state is describing the SIR reference value for TTIs that overlap with part of the transmission done on the alternative scrambling code and the other state is used for TTIs that overlap completely with part of the transmission done on the primary scrambling code. However, the modelling could also be extended to cover more than two states. A number of SIR states could be defined depending on the amount of a TTIs overlap with a transmission done on the alternative scrambling code. Thus, as an example, for the TTIs of FIG. 9, each having four frames, SIR references for TTIs having one, two, three or four compressed frames could be defined in addition to the SIR reference for TTIs having only normal mode frames. However, when more states are defined, the statistics of the states will be updated less often, which could lead to a slower system response. Thus the described two state model seems to be a good compromise. Since compressed mode frames occur rather frequently, e.g. every third to seventh frame, there will be no lack of data when updating a two state model.

In the above the invention has been described in relation to the switching between one scrambling code (primary or secondary) used in normal mode frames and an alternative scrambling code used in compressed frames. However, the described solution is just as suitable in other situations with shifts between different scrambling codes, e.g. when the base station switches between the primary scrambling code and one of the corresponding secondary scrambling codes Although a preferred embodiment of the present invention has been described and shown, the invention is not restricted to it, but may also be embodied in other ways within the scope of the subject-matter defined in the following claims.

The invention claimed is:

1. A method for controlling a power level of signals transmitted from a first transceiver to a second transceiver in a wireless communications system, wherein said signals are transmitted under use of one of at least a first and a second scrambling code, the method comprising
in an inner power control loop:
estimating repetitively a quality measure for signals received in the second transceiver;
generating a power control command in dependence on said quality measure and a quality measure reference value;
transmitting the power control command to the first transceiver; and
adjusting in the first transceiver said power level in dependence on the power control command; and
in an outer power control loop:
calculating a performance level for signals received in the second transceiver during a time interval; and
adjusting said quality measure reference value in dependence on said performance level,
wherein the method further comprises:
adjusting in said outer loop selectively first and second quality measure reference values, wherein said first quality measure reference value is adjusted in dependence on a performance level calculated for time intervals in which all signals are transmitted under use of said first scrambling code, and said second quality measure reference value is adjusted in dependence on a performance level calculated for time intervals in which at least some signals are transmitted under use of said second scrambling code; and
using, as the quality measure reference value in said step of generating a power control command, said first quality measure reference value during time intervals in which all signals are transmitted under use of said first scrambling code, and said second quality measure reference value during at least a part of time intervals in which at least some signals are transmitted under use of said second scrambling code.

2. A method of generating power control commands in a transceiver for receiving signals transmitted from a remote transceiver in a wireless communications system under use of one of at least a first and a second scrambling code, the method comprising:
estimating repetitively a quality measure for signals received in the transceiver;
generating a power control command in dependence on said quality measure and a quality measure reference value;
transmitting the power control command to the first transceiver; and
calculating a performance level for signals received in the transceiver during a time interval; and
adjusting said quality measure reference value in dependence on said performance level,
wherein the method further comprises:
adjusting selectively first and second quality measure reference values, wherein said first quality measure reference value is adjusted in dependence on a performance level calculated for time intervals in which all signals are transmitted under use of said first scrambling code, and said second quality measure reference value is adjusted in dependence on a performance level calculated for time intervals in which at least some signals are transmitted under use of said second scrambling code; and
using, as the quality measure reference value in said step of generating a power control command, said first quality measure reference value during time intervals in which all signals are transmitted under use of said first scrambling code, and said second quality measure reference value during at least a part of time intervals in which at least some signals are transmitted under use of said second scrambling code.

3. A method according to claim 1, wherein the signals are transmitted in a Wideband Code Division Multiple Access system.

4. A method according to claim 3, wherein said quality measure is estimated as a Signal-to-Interference Ratio.

5. A method according to claim 3, wherein said performance level is calculated as a Block Error Rate.

6. A method according to claim 3, wherein said first scrambling code is a primary scrambling code and said second scrambling code is a secondary scrambling code.

7. A method according to claim 3, wherein said first scrambling code is one of a primary and a secondary scrambling code and said second scrambling code is an alternative scrambling code.

8. A method according to claim 7, wherein said time interval is a Transmission Time Interval comprising a number of frames, wherein each Transmission Time Interval in which at least some signals are transmitted under use of said second scrambling code comprises at least one frame in which the signals are transmitted in a compressed mode under use of said alternative scrambling code.

9. A method according to claim 8, wherein said second quality measure reference value is used as the quality measure reference value in all frames of a Transmission Time Interval in which at least some signals are transmitted under use of said second scrambling code.

10. A method according to claim 8, wherein said second quality measure reference value is used as the quality measure reference value in compressed mode frames of a Transmission Time Interval in which at least some signals are transmitted under use of said second scrambling code, while said first quality measure reference value is used as the quality measure reference value in other frames of such Transmission Time Interval.

11. A method according to claim 1, wherein the method further comprises:
adjusting, in addition to said second quality measure reference value, at least one further quality measure reference value in dependence on a performance level calculated for time intervals in which at least some signals are transmitted under use of said second scrambling code, wherein each of said second and further quality measure reference value is adjusted for different amounts of signals transmitted under use of said second scrambling code; and using, as the quality measure reference value in the step of generating a power control command, during at least a part of time intervals in which at least some signals are transmitted under use of said second scrambling code, one of said second and further quality measure reference value in dependence of the amount of signals transmitted under use of said second scrambling code.

12. A transceiver for receiving signals transmitted from a remote transceiver in a wireless communications system under use of one of at least a first and a second scrambling code, said transceiver comprising a controller for generating power control commands, said controller comprising:
circuitry configured to estimate repetitively a quality measure for signals received in the transceiver;
circuitry configured to generate a power control command in dependence on said quality measure and a quality measure reference value;
circuitry configured to transmit the power control command to the remote transceiver;
circuitry configured to calculate a performance level for signals received in the transceiver during a time interval; and
circuitry configured to adjust said quality measure reference value in dependence on said performance level,
wherein:
said circuitry configured to adjust is arranged to adjust selectively first and second quality measure reference values, so that said first quality measure reference value is adjusted in dependence on a performance level calculated for time intervals in which all signals are transmitted under use of said first scrambling code, and said second quality measure reference value is adjusted in dependence on a performance level calculated for time intervals in which at least some signals are transmitted under use of said second scrambling code; and
said circuitry configured to generate is arranged to use, as the quality measure reference value, said first quality measure reference value during time intervals in which all signals are transmitted under use of said first scrambling code, and said second quality measure reference value during at least a part of time intervals in which at least some signals are transmitted under use of said second scrambling code.

13. A transceiver according to claim 12, wherein the transceiver is arranged to receive signals that are transmitted in a Wideband Code Division Multiple Access system.

14. A transceiver according to claim 13, wherein said circuitry configured to estimate is arranged to estimate said quality measure as a Signal-to-Interference Ratio.

15. A transceiver according to claim 13, wherein said circuitry configured to calculate is arranged to calculate said performance level as a Block Error Rate.

16. A transceiver according to claim 13, wherein said first scrambling code is a primary scrambling code and said second scrambling code is a secondary scrambling code.

17. A transceiver according to claim 13, wherein said first scrambling code is one of a primary and a secondary scrambling code and said second scrambling code is an alternative scrambling code.

18. A transceiver according to claim 17, wherein said time interval is a Transmission Time Interval comprising a number of frames, wherein the transceiver is arranged to receive signals wherein each Transmission Time Interval in which at least some signals are transmitted under use of said second scrambling code comprises at least one frame in which the signals are transmitted in a compressed mode under use of said alternative scrambling code.

19. A transceiver according to claim 18, wherein said circuitry configured to generate is arranged to use said second quality measure reference value as the quality measure reference value in all frames of a Transmission Time Interval in which at least some signals are transmitted under use of said second scrambling code.

20. A transceiver according to claim 18, wherein said circuitry configured to generate is arranged to use said second quality measure reference value as the quality measure reference value in compressed mode frames of a Transmission Time Interval in which at least some signals are transmitted under use of said second scrambling code, and to use said first quality measure reference value as the quality measure reference value in other frames of such Transmission Time Interval.

21. A transceiver according to claim 12, wherein:
said circuitry configured to adjust is arranged to adjust, in addition to said second quality measure reference value, at least one further quality measure reference value in dependence on a performance level calculated for time intervals in which at least some signals are transmitted under use of said second scrambling code, and to adjust each of said second and further quality measure reference value for different amounts of signals transmitted under use of said second scrambling code; and
said circuitry configured to generate is arranged to use, as the quality measure reference value, during at least a part of time intervals in which at least some signals are transmitted under use of said second scrambling code, one of said second and further quality measure reference value in dependence of the amount of signals transmitted under use of said second scrambling code.

22. A non-transitory computer readable medium having stored thereon program code for performing a method when said program code is run on a computer, wherein the method is for controlling a power level of signals transmitted from a first transceiver to a second transceiver in a wireless communications system, wherein said signals are transmitted under use of one of at least a first and a second scrambling code, and wherein the method comprises:
in an inner power control loop:
estimating repetitively a quality measure for signals received in the second transceiver;
generating a power control command in dependence on said quality measure and a quality measure reference value;
transmitting the power control command to the first transceiver; and
adjusting in the first transceiver said power level in dependence on the power control command; and
in an outer power control loop:
calculating a performance level for signals received in the second transceiver during a time interval; and
adjusting said quality measure reference value in dependence on said performance level,
wherein the method further comprises:
adjusting in said outer loop selectively first and second quality measure reference values, wherein said first quality measure reference value is adjusted in dependence on a performance level calculated for time intervals in which all signals are transmitted under use of said first scrambling code, and said second quality measure reference value is adjusted in dependence on a performance level calculated for time intervals in which at least some signals are transmitted under use of said second scrambling code; and using, as the quality measure reference value in said step of generating a power control command, said first quality measure reference value during time intervals in which all signals are transmitted under use of said first scrambling code, and said second quality measure reference value during at least a part of time intervals in which at least some signals are transmitted under use of said second scrambling code.

* * * * *

UNITED STATES PATENT AND TRADEMARK OFFICE
CERTIFICATE OF CORRECTION

| | | |
|---|---|---|
| PATENT NO. | : 8,149,763 B2 | Page 1 of 1 |
| APPLICATION NO. | : 12/296444 | |
| DATED | : April 3, 2012 | |
| INVENTOR(S) | : Wang et al. | |

It is certified that error appears in the above-identified patent and that said Letters Patent is hereby corrected as shown below:

In Column 11, Line 54, delete "real-location" and insert -- re-allocation --, therefor.

Signed and Sealed this
Thirtieth Day of October, 2012

David J. Kappos
*Director of the United States Patent and Trademark Office*